April 21, 1931.   O. E. SIMMONDS   1,802,283
AEROPLANE WING
Filed Jan. 11, 1929   2 Sheets-Sheet 1

INVENTOR
Oliver Edwin Simmonds
BY
ATTORNEY

April 21, 1931.   O. E. SIMMONDS   1,802,283
AEROPLANE WING
Filed Jan. 11, 1929   2 Sheets-Sheet 2

Oliver Edwin Simmonds INVENTOR
BY
ATTORNEY

Patented Apr. 21, 1931

1,802,283

UNITED STATES PATENT OFFICE

OLIVER EDWIN SIMMONDS, OF HOLMFELS, WOOLSTON, ENGLAND

AEROPLANE WING

Application filed January 11, 1929, Serial No. 331,817, and in Great Britain February 24, 1928.

In the aeroplane industry, it is usual for each wing of an aeroplane to be designed and constructed individually according to its particular position on the aircraft. For example, the design and construction of a bottom starboard plane is peculiar to itself and not such as to allow of its being rigged in any position other than that for which it is intended. A wing on the port side cannot with existing practice be changed for one on the starboard, and so on.

It has previously been proposed to provide an aircraft having wings each of substantially elliptical form and constructed about a single main longitudinal spar and a single main transverse spar and each braced to the fuselage by two struts one connected to the forward end of the transverse spar and the other to the after end thereof, a joint being also provided at the inner end of each wing for the purpose of attachment to the fuselage. Such wings are not, however, interchangeable since all the corresponding members on either side of the plane of symmetry are not designed so as to be capable of transmitting such loads that each end of a wing can be made either the inner end or the outer tip.

The object of my invention is so to design and construct the wings of aeroplanes as to render them interchangeable on the same or similar aircraft. The result of this is that great economy can be achieved in drawing office charges, cost of jigs, and workshop organization, due mainly to the consequent reduction of parts. The invention also enables a greatly reduced number of the spares carried to render the same service as with an aeroplane of usual construction.

The above improvemnts can be adopted without incurring any loss of aerodynamic efficiency.

According to my invention, in the construction of aircraft wings, I make two or more planes of symmetrical aerofoil section or symmetrical design in plan form and provide the same with means of attachment whereby two or more planes are interchangeable on the fuselage of the same construction, while one or more planes on one machine is or are interchangeable with one or more planes on a similar fuselage.

In one form of my invention, each wing is streamlined on top and bottom symmetrically about a straight centre line running from the leading to the trailing edge. It can therefore be rigged with either face upwards, the result always being the same, but the means of attachment of each plane to the fuselage or other central member and to another plane, must be such that it can be chosen indiscriminately for the port or starboard side of the machine, for the top or bottom position on a biplane or for any location whatsoever on an aircraft of less orthodox design. It is desirable, for this purpose, that the inner ends of the wing spars shall have their faces normal to the main axes of the wing. This construction permits the outer ends of the central member to be of uniform design.

If it is desired that the wing above described shall be cambered, notwithstanding that it has been constructed as a symmetrical figure, this can be done by adding a suitably shaped piece or pieces on to the nose or upper or lower surface (or any two or more of these together), one such piece being usually sufficient. Thus a non-symmetrical nose or leading edge piece may be detachably secured to the leading edge of the wing, the surface of such nose merging with the top and bottom surfaces of the wing, and being so shaped and positioned that its apex comes below the centre line above mentioned. The effect of the addition of this nose will be to prolong the upper face of the wing a little forwardly and downwardly, and to continue the bottom face in a more flattened shape to the tip of the nose, the effect of a cambered wing being thereby attained. The nose or cambering just mentioned must be easily attachable and detachable, because it will require to be transferred to the other face of the plane when the latter is inverted for use upon the opposite side of the machine as will be obvious. Any suitable means of attachment may be provided.

In a modification of the invention, only a main central section of the wing is made of symmetrical form and the nose or leading edge section, which supplies the camber, is attached along a straight joint or any other shape of joint which may be convenient for ready attachment and detachment for the purpose of inverting for the reason above stated.

The trailing edge may likewise, or in other manner, be separately attached to the symmetrically fashioned main body of the wing, so as to enable it to be turned over or inverted in relation thereto when desired.

Where a centre plane or planes may be in use, it must be designed, as will be easily understood, so as to provide for any adjustments in dihedral, sweepback and/or stagger that may be required as between one plane and another.

With regard to the securing of one wing to another it is necessary that the fittings for the attachment of struts and wires should either be fixed on each surface of the wing or should be capable of being transferred from one surface to the other in a simple manner. If the standard type of wing wiring plate be used, the interplane bays, as seen in front elevation, should be rectangular or very nearly so, and in the event, therefore, of the wings being given dihedral angle it will be necessary for the top central portion to be of less span than the bottom.

In designs where the interplane bays in front and/or side elevation are not nearly rectangular, the wiring plates for interplane wires can be rendered suitable for each position in which they may have to be used by hinging them at the usual bend line.

In another modification, the wing may in shape and in general design be symmetrical or substantially symmetrical in plan form about a fore and aft vertical plane, not in the plane of symmetry of the aircraft. By "symmetrical design in plan form" is indicated not only a superficial symmetry in plan form, but also a general symmetry in design wherein all corresponding members on either side of the plane of symmetry are capable of transmitting such loads that each end of a plane can be made either the inner end or the outer tip. It will be clear that in this method of construction, it becomes unnecessary to invert the wing and thus any aerofoil section, either of cambered or symmetrical profile can be used without the necessity of detachable portions or camberings. When a wing is constructed in the first instance with a straight inner end and hence also with a straight outer end, it is still possible to make the outer end curved in plan form by providing it with a detachable end piece or tip which is curved or otherwise suitably shaped. Attachment fittings to the fuselage, other central member or other main wing, must either be provided in and/or on each side of the plane of symmetry of the wing and (in the case of fittings for the attachment of the struts and wires) on each surface or alternatively they must be easily detachable so that the wing can be used either as a part or starboard, top, bottom or intermediate plane.

With regard to the ailerons in this form of the invention, these would have either to be fitted at each end of the wing or else the whole trailing portion could be hinged. The inner aileron in the former case could either be operated in the sense of an aileron or of a flap. Alternatively it could be locked and if desired the gaps could be fabricked over.

In the foregoing explanation of this invention it has been treated for simplicity solely in its application to the main wings of a conventional aeroplane. It can, however, be applied to any subsidiary unit on an aircraft. On a very large aircraft it might be convenient to design the tail plane or planes in several portions so that the tip portions would be interchangeable with each other and possibly also with the centre portion. In addition, the tip or centre portion could be used as vertical fins both in a monoplane or multiplane tail unit. On smaller machines it is desirable to divide up the tail plane as indicated above in order to reduce the number of different parts liable to require renewal.

Nevertheless it is not essential to the invention that all wings should be completely interchangeable on a given aircraft. For instance, the top wings might be interchangeable with each other, but not with the bottom; the starboard wings might be interchangeable with each other but not with the port and so on.

In the case of the use of slotted wings, the leading edge of the wing would be removed or recessed intermediate its ends to receive the usual auxiliary wing device, the supporting levers of which might, for example, be carried on brackets bolted to the front longitudinal spar of the main wing. The main wing when fitted with the auxiliary wing, would be used normally as a top plane and when transferred to act as a bottom plane would be provided with a removable leading edge portion supported by means of the bolts referred to above and adapted to fill up the gap or recess wherefrom the auxiliary wing has been removed.

Some typical forms of my invention are shown diagrammatically in the accompanying drawings, and reference will now be made to these in order to explain the invention more fully.

Figure 1:
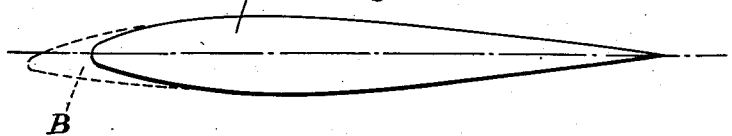
Figures 1 to 5 are views of aerofoil sections as explained hereinafter.

In the form illustrated by Fig. 1, the body of the wing A is of symmetrical streamline section and a non-symmetrical nose B (drawn in dotted lines) is provided at its leading edge so as to give the wing a camber. The nose B is made detachable for the reason previously stated.

Figure 2:
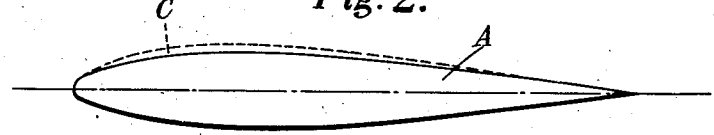

According to the form shown in Fig. 2, the symmetrical body of the wing A carries a thickening piece C (shown in a curved dotted line) on its upper surface in order to produce the effect of a camber.

Figure 3:
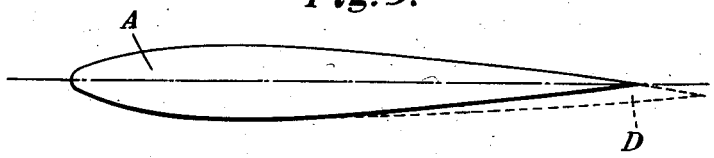

In Fig. 3, an extra piece D is added to the trailing edge for the same purpose as already mentioned.

Figure 4:
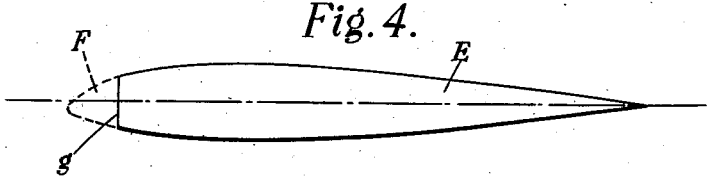

Fig. 4 shows a modification in which the wing section consists of two parts, namely a main section E and a cambering nose section F, (shown dotted) which is detachable, the two being united along a straight line or end surface $g$ which is normal to the fore and aft centre line of the section E.

Figure 5:
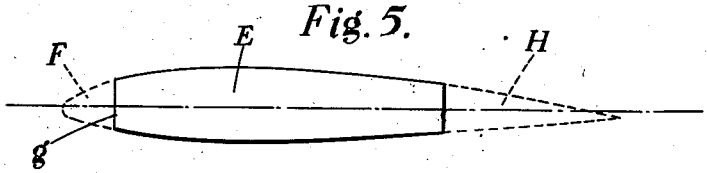

Fig. 5 shows a similar arrangement in which a tail section H (in dotted lines) is detachably connected to the rear edge of a "truncated" centre section E.

The portions B, C, D, F, and H shown in these diagrammatic views are intended to retain their true flight positions although the main section of the wing has been reversed for the purpose of being used on the other side of the machine. When the wing is inverted, therefore, the portions just mentioned (or one of them, as the case may be) must be removed from the position it or they occupied on the wing and re-fixed upon the other face of the wing, whereby the latter, though its main symmetrical portion is reversed, will preserve the same cambered section as it possessed before.

Figure 6:
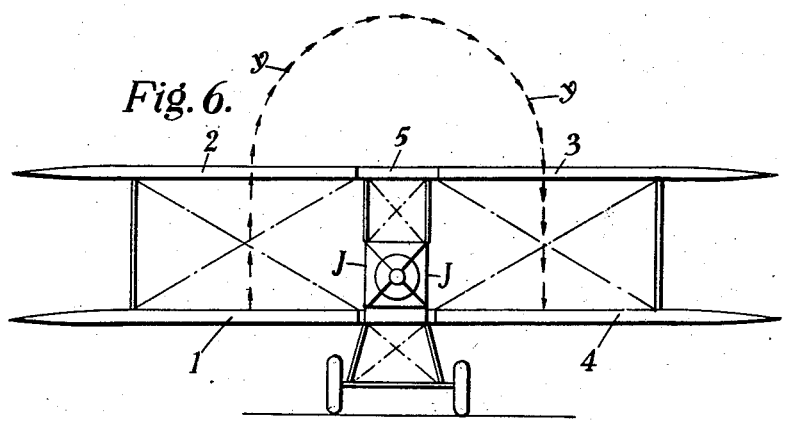
Figure 6 is a front elevation of a biplane fitted with the said invention in one of its forms.
Figure 7:
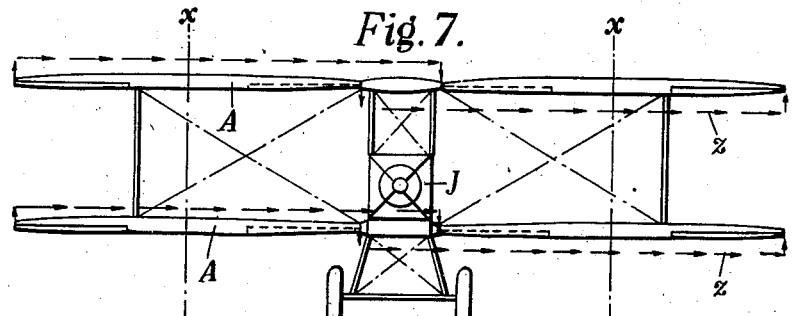
Figures 7 and 8 show another form in front elevation and plan respectively, the line $x$ being a line drawn fore and aft through the centre of each wing.
Figure 8:
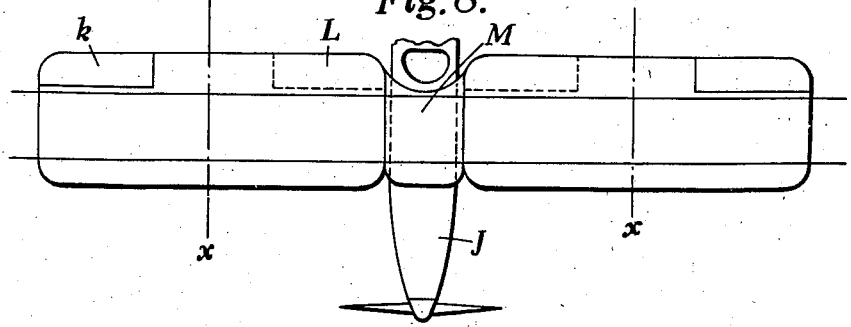

In Fig. 6 is seen the fuselage J with two wings 1, 2 upon one side and another pair 3, 4 upon the other. An upper central plane 5 is also shown. An arch of arrows $y$ represents graphically the interchangeability of the wings inter se, when they are all of the same shape and size. The wing 2, for example, is transferable to the place occupied by the wing 3, by lifting it over in the direction of the arrows $y$. Any one of the wings is interchangeable with any of the others in a similar fashion. In Figs. 7 and 8 are shown in front elevation and plan view respectively a biplane with the wings A. A. symmetrical about a fore and aft line $x$. A series of arrows $z$ represents graphically the interchangeability of the wings from port to starboard without inverting them, but the interchangeability from top to bottom is not here graphically indicated. Of the two ailerons $k$ L (Fig. 8), the inner one L can be locked, and the hinge gap could, if desired, be covered over with fabric, the aileron L therefore being denoted in dotted lines. One aileron running the whole length of the wing could be used, if more convenient, in place of the two ailerons $k$ L. If the wings here illustrated were of symmetrical aerofoil section, they could of course be inverted, and it would be unnecessary to provide the extra ailerons L. The attachment devices to the fuselage J, or the centre plane M or of one plane directly on to the other must clearly be provided for at each end of each wing in this construction.

It is to be understood that the invention includes also any wing that is symmetrical in plan form about the plane of symmetry of the aircraft, both as a bottom plane and top plane. To achieve this interchange all that is necessary would, of course, be that the interplane and attachment fittings should be either on both surfaces or the wings or easily detachable. The bottom plane would run through, under or above the fuselage or hull, and the top wing or wings would run right across the body in the usual way.

Figure 9:
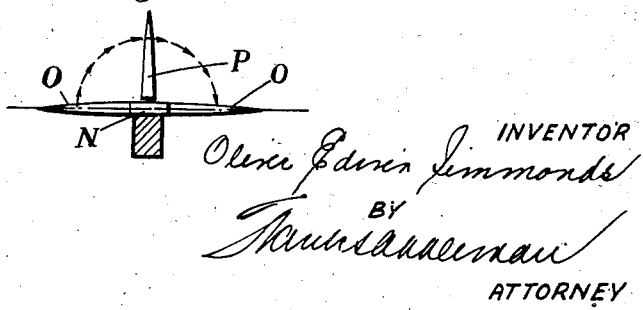
Figure 9 shows in front elevation a tail unit constructed in accordance with the said invention in one of its forms.

The application of this invention to a monoplane tail unit is shown in the front elevation in Fig. 9, the tail plane here consisting of a permanent centre portion N, and two small extension planes O of symmetrical and similar section and therefore interchangeable. One or more of the latter can be added, as shown by P, to serve as the usual stabilizing fin.

I claim:

1. A new article of manufacture, an aerofoil having an intermediate portion of identical surface contour on opposite sides, and an entrance edge which extends below the plane of the longitudinal center of said intermediate portion.

2. An aerofoil having in cross section a symmetrical intermediate portion and at its leading edge a non-symmetrical portion to impart a camber to the aerofoil.

3. An areofoil having an intermediate portion of like transverse contour, and an advancing edge and a following edge, both of which extend below the plane of the center of the intermediate portion.

4. An aerofoil comprising a rearwardly extending portion and an advancing portion therefor which is both removably and reversibly secured to the forward end of the body portion.

5. An aerofoil comprising an intermediate section to the opposite ends of which are detachably and reversibly secured an advancing edge portion and a following edge portion shaped to give a camber to the intermediate section when reversed.

6. In an aeroplane, the combination with the fuselage of two or more stationary planes each of symmetrical aerofoil section, and means of attachment whereby the planes are interchangeable as a whole on the fuselage as from port to starboard.

7. In an aeroplane, the combination with the fuselage of a center section plane, of two or more stationary planes each of symmetrical aerofoil section, and means of attachment whereby two or more planes are interchangeable as a whole on the fuselage as from port to starboard.

8. In an aeroplane, the combination with one or more center sections, of two or more stationary planes each of symmetrical areofoil section, and means of attachment whereby two or more planes are interchangeable as a whole on the center sections from port to starboard.

9. In an aeroplane, the combination with the fuselage of planes each corresponding in shape and in general design symmetrically about a transverse line not in the plane of symmetry of the aircraft, and means whereby two or more of like planes are interchangeable as a whole from port to starboard on the fuselage.

10. In an aeroplane, the combination with the fuselage having a center section plane, of two or more stationary planes each of like shape and general design about a transverse line not in the plane of symmetry of the aircraft, and means of attachment whereby two or more planes are interchangeable as a whole from port to starboard.

11. In an aeroplane, the combination with the center section planes, of two or more stationary planes each of the same shape and design in plan about a fore and aft line not in the plane of symmetry of the aircraft, and attaching means whereby two or more planes are interchangeable as a whole on the center sections from port to starboard.

In witness whereof I have signed this specification.

O. E. SIMMONDS.